(12) United States Patent
Citro et al.

(10) Patent No.: US 11,788,517 B2
(45) Date of Patent: Oct. 17, 2023

(54) BISTABLE SHAPE MEMORY ALLOY INERTIAL ACTUATOR

(71) Applicant: SAES GETTERS S.P.A., Lainate MI (IT)

(72) Inventors: Marco Citro, Varese (IT); Stefano Alacqua, Como (IT); Salvatore Coco, Cesano Maderno (IT); Giorgio Vergani, Monza (IT)

(73) Assignee: SAES GETTERS S.P.A., Milian (IT)

( * ) Notice: Subject to any disclaimer, the term of this patent is extended or adjusted under 35 U.S.C. 154(b) by 74 days.

(21) Appl. No.: 17/797,509

(22) PCT Filed: Mar. 24, 2021

(86) PCT No.: PCT/EP2021/057648
§ 371 (c)(1),
(2) Date: Aug. 4, 2022

(87) PCT Pub. No.: WO2021/197980
PCT Pub. Date: Oct. 7, 2021

(65) Prior Publication Data
US 2023/0054660 A1    Feb. 23, 2023

(30) Foreign Application Priority Data
Mar. 30, 2020   (IT) .......................... 102020000006634

(51) Int. Cl.
*F03G 7/06* (2006.01)
*H01H 61/01* (2006.01)

(52) U.S. Cl.
CPC .......... *F03G 7/06143* (2021.08); *F03G 7/0616* (2021.08); *F03G 7/0635* (2021.08); *F03G 7/0636* (2021.08); *F03G 7/064* (2021.08); *H01H 61/0107* (2013.01)

(58) Field of Classification Search
CPC ... F03G 7/06143; F03G 7/0616; F03G 7/0635; F03G 7/0636; F03G 7/064; H01H 61/0107
USPC ................. 335/80; 337/123, 140, 12, 14
See application file for complete search history.

(56) References Cited

U.S. PATENT DOCUMENTS

| | | | |
|---|---|---|---|
| 6,016,096 A * | 1/2000 | Barnes et al. | H01H 61/0107 337/140 |
| 6,943,653 B2 | 9/2005 | Hanke et al. | |
| 2006/0091342 A1* | 5/2006 | Butera et al. | F16K 31/025 251/129.01 |
| 2012/0151913 A1* | 6/2012 | Foshansky | F16K 31/003 60/527 |
| 2015/0048921 A1* | 2/2015 | Alacqua et al. | H01H 71/10 337/140 |
| 2015/0274078 A1* | 10/2015 | Alacqua et al. | F03G 7/065 60/528 |

FOREIGN PATENT DOCUMENTS

WO      2004032994 A2    4/2004

OTHER PUBLICATIONS

International Preliminary Report on Patentability issued May 2, 2022 in PCT/EP2021/057648.
International Search Report issued May 20, 2021 in PCT/EP2021/057648.
Written Opinion issued May 20, 2021 in PCT/EP2021/057648.

* cited by examiner

*Primary Examiner* — Hoang M Nguyen
(74) *Attorney, Agent, or Firm* — Element IP, PLC

(57) ABSTRACT

Bistable shape memory alloy inertial actuator capable of preventing accidental actuation caused by environmental temperature variations, its method of operation and its use in devices.

15 Claims, 6 Drawing Sheets

BISTABLE SHAPE MEMORY ALLOY INERTIAL ACTUATOR

Figure 1:
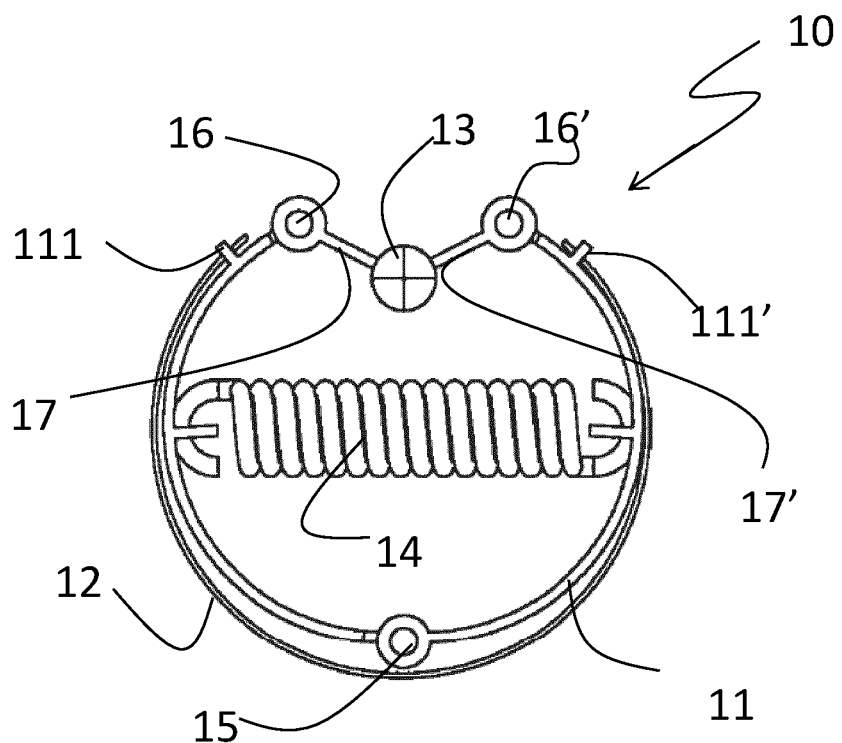

The present invention relates to a bistable current-controlled inertial actuator, its method of operation and its use in devices, and in particular to an actuator in which the driven element is moved by one or more wires made from a shape memory alloy (indicated in the following as "SMA").

It is known that the shape memory phenomenon consists in the fact that a mechanical piece made of an alloy that exhibits said phenomenon is capable of transitioning, upon a temperature change, between two shapes that are preset at the time of manufacturing, in a very short time and without intermediate equilibrium positions. A first mode in which the phenomenon may occur is called "one-way" in that the mechanical piece can change shape in a single direction upon the temperature change, e.g. passing from shape A to shape B, whereas the reverse transition from shape B to shape A requires the application of a mechanical force.

On the contrary, in the so-called "two-way" mode both transitions can be caused by temperature changes, this being the case of the application of the present invention. This occurs thanks to the transformation of the micro-crystalline structure of the piece that passes from a type called martensitic, stable at lower temperatures, to a type called austenitic, stable at higher temperatures, and vice versa (M/A and A/M transition).

A SMA wire has to be trained so that it can exhibit its features of shape memory element, and the training process of a SMA wire usually allows to induce in a highly repeatable manner a martensite/austenite (M/A) phase transition when the wire is heated and to induce an austenite/martensite (A/M) phase transition when the wire is cooled. In the M/A transition the wire undergoes a shortening by 3-5% which is recovered when the wire cools down and through the A/M transition returns to its original length.

This characteristic of SMA wires to contract upon heating and then to re-extend upon cooling has been exploited since a long time to obtain actuators that are very simple, compact, reliable and inexpensive. In particular, this type of actuator is used in some bistable electric switches to perform the movement of a drive element from a first stable position to a second stable position and vice versa. It should be noted that the term "drive element" is intended here to have a very generic meaning since it can take countless shapes according to specific manufacturing needs, as long as it is the element whose movement determines the commutation of the switch between two stable operating positions.

Some examples of bistable SMA wire actuators are described in U.S. Pats. Nos. 4.544.988, 5.977.858, 6.943.653 and European patent number 2.735.013, in the applicant's name, all describing solutions with two SMA wires.

One of the major drawbacks common to all these solution is that they cannot prevent unintentional actuations linked to changes in the surrounding environment, as the SMA wires actuation is based on temperature. This problem may be very acute when the SMA-based actuators are within a device that heats up during operation.

Another example of a bistable SMA actuator is described in U.S. Pat. No. 4.965.545, where the bistable behavior is achieved through the use of SMA wires in antagonistic configuration.

A SMA-based solution exploiting a different principle is described in US 8.656.713 disclosing an inertial actuator where an inertial mass is separated from the actuator body and driven over a longer distance by impulse activation. This implies a high degree of customization for properly designing the return mechanism and an unavoidable delay when the system needs to be switched back in the starting position, as well as a lack of "symmetry" between the two stable configurations that may prevent its successful usage in certain applications, for example flow diverters as described later on.

Purpose of the present invention is to overcome the drawbacks of the prior art with a solution capable of fast switching and preventing accidental actuation and in a first aspect thereof consists a bistable shape memory alloy inertial actuator comprising a body connected to one or more shape memory alloy wires actuatable through a short current pulse, said one or more shape memory alloy wires having a diameter comprised between 0.025 and 0.5 mm and being in operational contact with an inertial element having mass M that moves between a first stable position and a second stable position and vice versa under the concurrent actuation of said one or more shape memory alloy wires. Said inertial actuator is subjected to an elastic locking force with an elastic constant K acting thereon, expressed in g/mm, which in the most preferred embodiment is provided by a spring mounted on the body.

The actuator has a characterizing parameter P defined as the inverse of said elastic constant, i.e. $1/K$ expressed in mm/g, multiplied by the ratio between mass M of the inertial element, expressed in grams, and the total cross-sectional area A, expressed in mm$^2$, of the shape memory alloy wires in operational contact with the inertial element of mass M, i.e. $P=(1/K)*(M/A)$. The inventors have surprisingly found that the system is essentially invariant with respect to the diameter of the wire(s), the elastic constant K and the inertial element mass M in terms of being capable of establishing a bistable behavior as long as the above-defined characterizing parameter P is within a specific range, namely is comprised between 15 and 750 mm$^{-1}$, preferably between 25 and 500 mm$^{-1}$.

The source of the current pulse is not an object of the present invention being widely known in the technical field that it could be part of the bistable inertial actuator (being mounted on the body) or simply external to it and connected to the one or more shape memory alloy wires through suitable cabling. For example, one of the easiest way to provide a short actuation pulse to a shape memory element is through a capacitor discharge, as described in the aforementioned US 8.656.713. Such capacitor could be easily integrated and mounted on the actuator body or be external to it.

In the present invention when a plurality of shape memory alloy wires are in operational contact with the inertial element of mass M, they usefully have the same or a very similar diameter (±10%) as otherwise the system will become complex in terms of SMA wires current control and regulation; moreover much of the work will be carried out by the wire with the biggest diameter, causing the additional ones to be a burdensome additional complication to deal with, with limited operational contribution.

It is important to underline that the present configuration maximizes the pull of the SMA wires as all the SMA wires concurrently contribute to the body mass displacement, allowing to achieve various advantages: higher mass displacement capability, miniaturization, a simplified control electronics. All of these are not achievable with the structure shown in the aforementioned US 4.965.545 due to the SMA wires being in antagonistic configuration.

It is also important to underline that as the shape memory alloy wires are real objects, departs from a circular section are possible, so the term diameter is to be intended as the diameter of the smallest enclosing circle.

Figure 2:
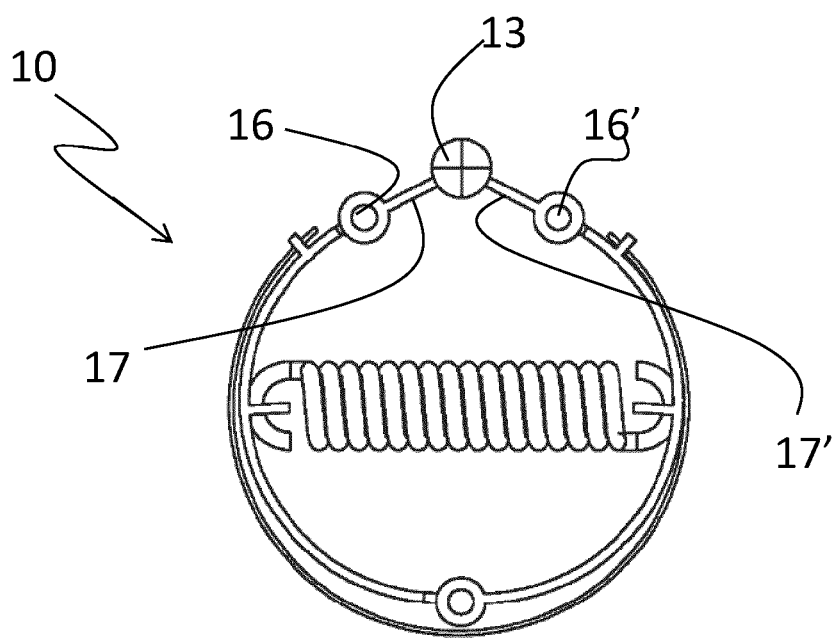
Figure 3A:
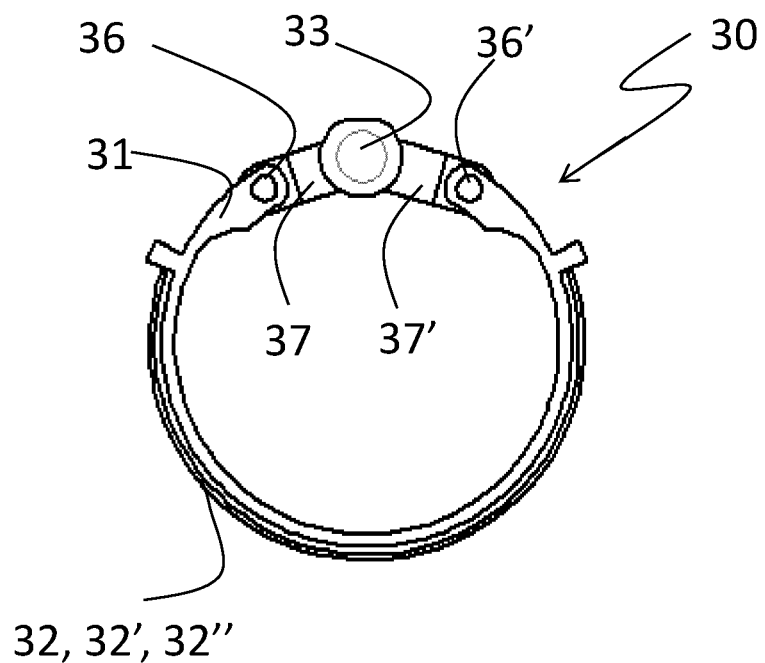
Figure 3B:
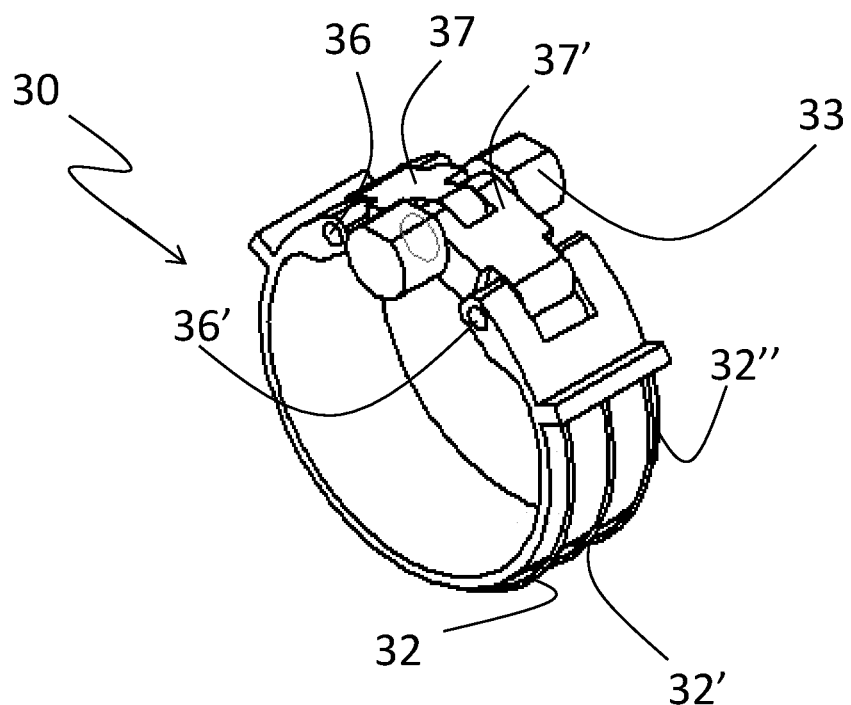
Figure 4:
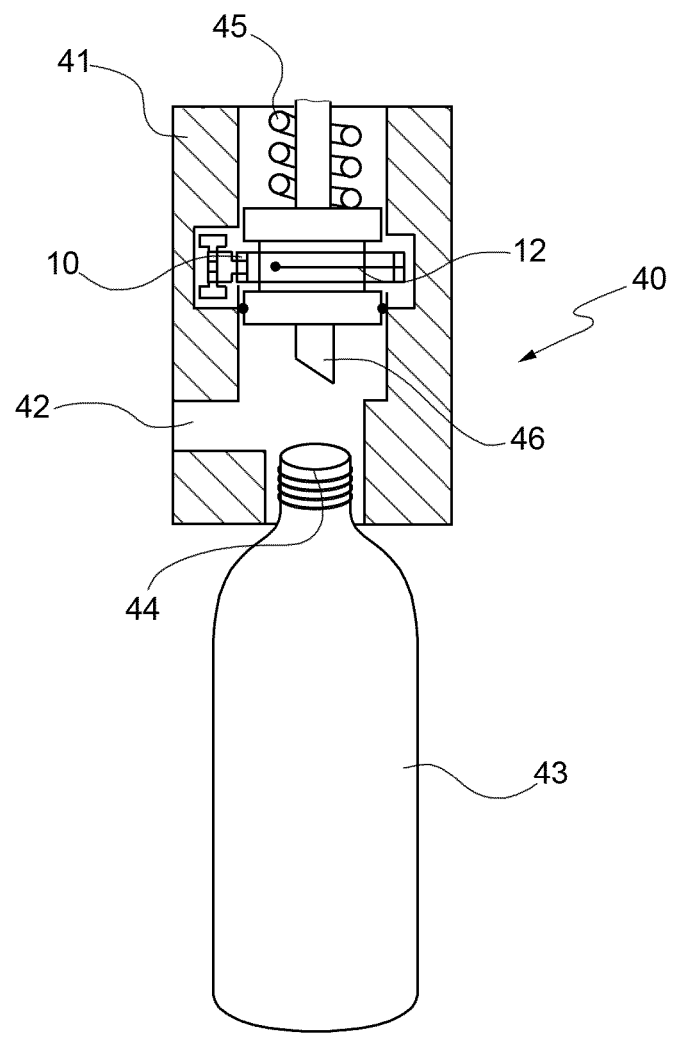
Figure 5:
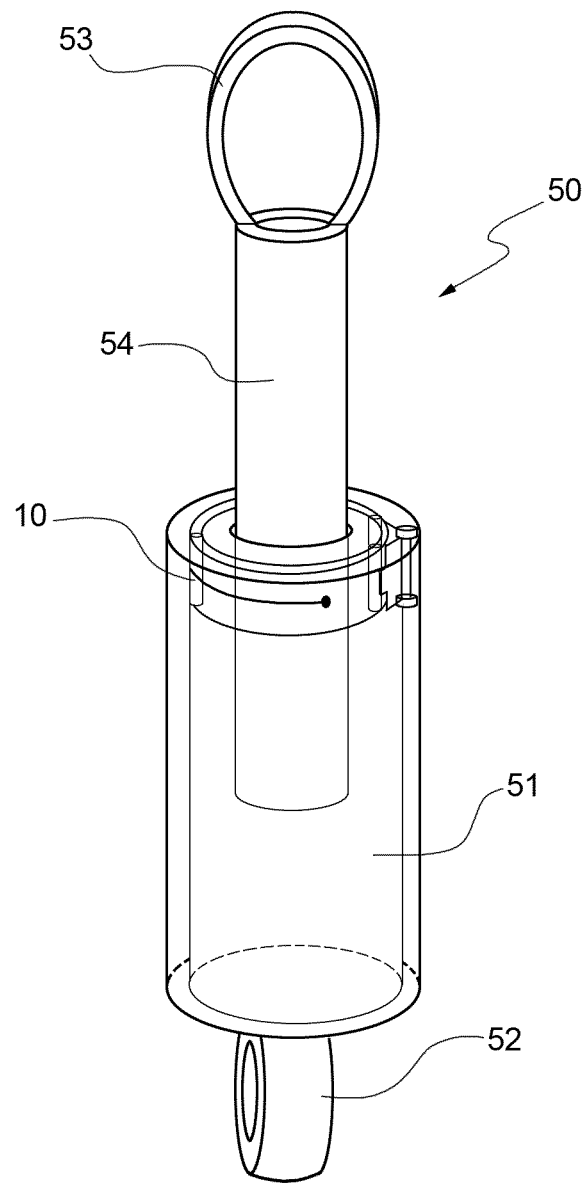
Figure 6:
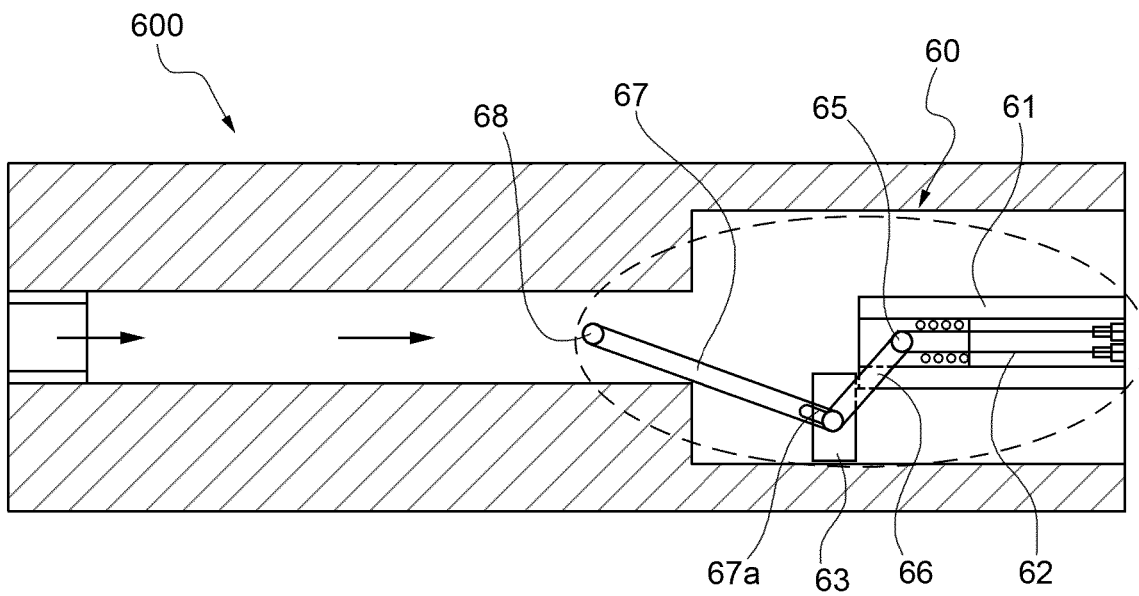
Figure 7:
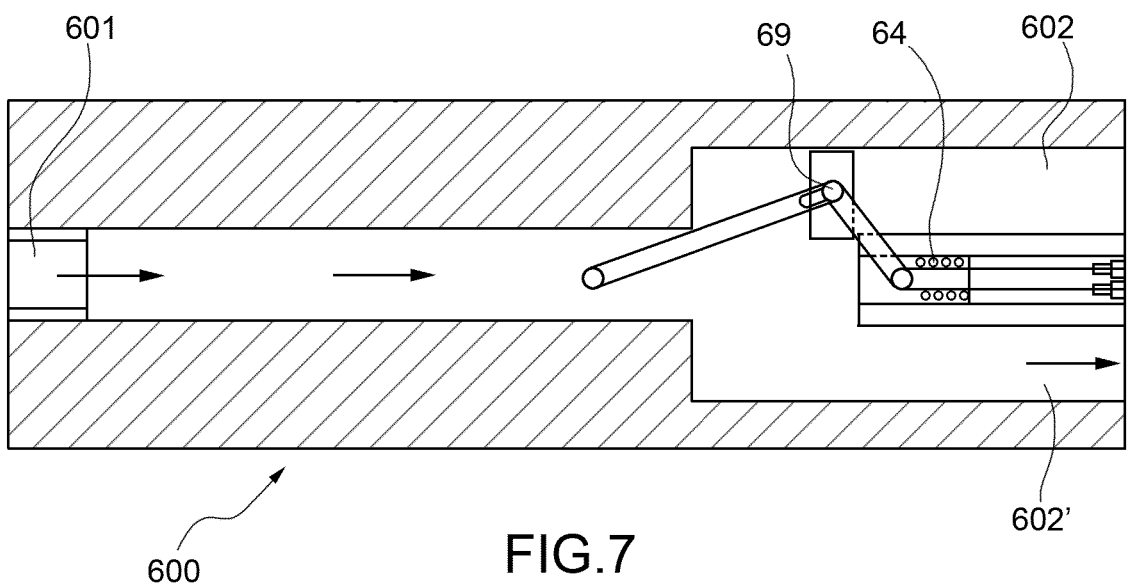
Figure 8:
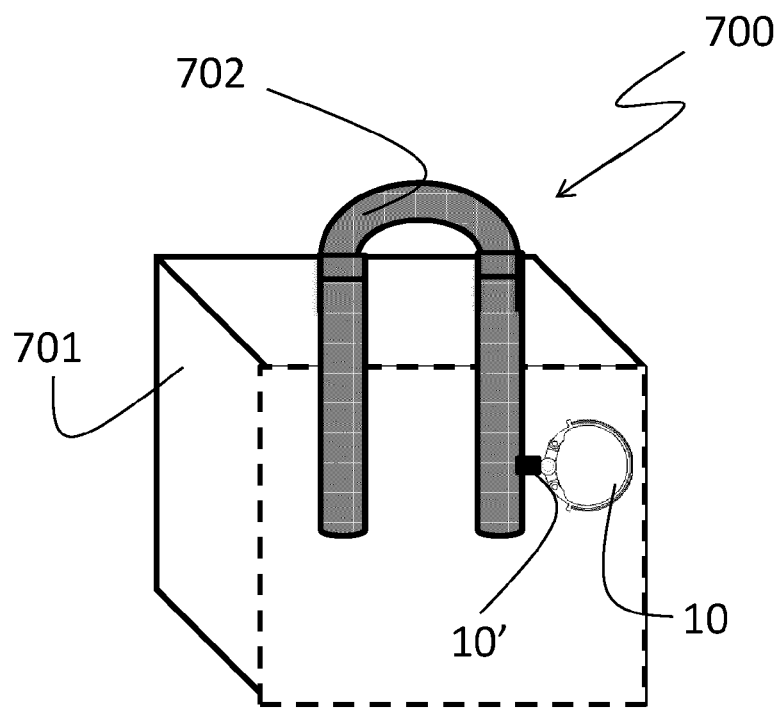
Figure 9:
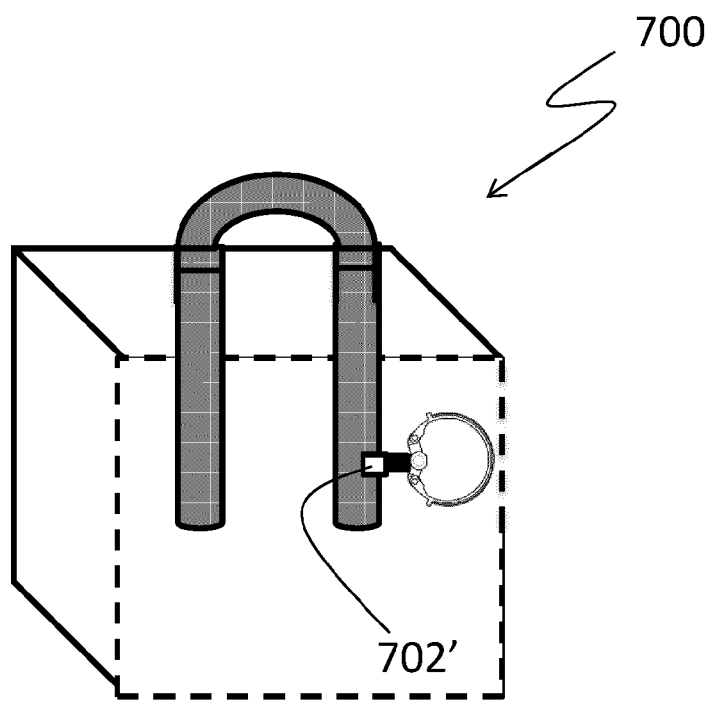

The invention will be further illustrated with the help of the following figures wherein:

FIGS. 1 and 2 are schematic views from above of a first embodiment of an actuator according to the present invention, where the inertial element is in its two stable positions respectively, FIGS. 3A and 3B are schematic views from above and in perspective, respectively, of a variant of the actuator of FIGS. 1-2, FIG. 4 is a schematic sectional view of an airbag incorporating a bistable SMA inertial actuator according to the present invention, FIG. 5 is a schematic see-through view of a damper incorporating a bistable SMA inertial actuator according to the present invention, FIGS. 6 and 7 are schematic sectional views of a flow diverter valve incorporating a bistable SMA inertial actuator according to a second embodiment, and FIGS. 8 and 9 are schematic perspective views of a padlock incorporating a bistable SMA inertial actuator according to the first embodiment.

In the figures the size and the dimensional ratios of the various elements shown in some case have been altered in order to help understanding the drawings, with particular but not exclusive reference to the SMA wire diameter with respect to other elements of the bistable actuator. Also some ancillary elements not necessary for the understanding of the invention, such as a current supply source, wire crimping/fixing elements, etc. have not been shown since they are ordinary means known in the technical field.

FIGS. 1 and 2 show schematic views from above of a bistable SMA inertial actuator 10 according to a first embodiment of the present invention in its two stable positions. On actuator body 11 having a main/major portion with a circular segment geometry, a shape memory alloy wire 12 is fixed at points 111, 111' close to the terminal parts of body 11. The circular segment portion of body 11 presents three hinges 15, 16, 16' the first one of which is located in the bottom central part of the actuator body 11, allowing and easing temporary enlarging of the body circular segment portion diameter, while the two other hinges, 16, 16' are symmetrically positioned in correspondence of the terminal parts of the body circular segment portion. Two arms 17, 17' of equal length pivotably connect hinges 16, 16' with the inertial element 13 of mass M. A spring 14 with elastic constant K acting as a locking elastic element connects opposite sides of the body circular segment portion (secant). In the first embodiment of FIGS. 1 and 2 spring 14 has a length equal to the diameter, but it could be shorter if placed in an upper of lower portion of the actuator body circular portion.

Upon rapid actuation and therefore shortening of the shape memory alloy wire 12, the body circular element portion enlarges and an acceleration is transmitted to the mass M that moves from the internal position depicted in FIG. 1 to the external position depicted in FIG. 2. The inertial element 13 of mass M is then stably and firmly held in that external position by the action of spring 14 that pulls the two hinges 16, 16' towards each other. When wire 12 is rapidly actuated again the same deformation mechanism of actuator body 11 accelerates the inertial element 13 that now returns to the internal position depicted in FIG. 1.

In this type of actuator configuration the main portion with a circular segment geometry length is preferably about from ⅔ to ⅚ of a full circle.

The circle diameter is preferably comprised between 1-2 mm and 20 cm or even larger, the variation in the circle diameter taking into account the different applications that can benefit from the use of a bistable inertial actuator according to the present invention, such as a mobile camera autofocus actuator for the smaller ones, and friction regulation of hydraulic equipment moving parts, such as pistons, for the larger ones.

It is to be underlined that the present invention is not strictly limited to the elements and configurations as shown in FIGS. 1-2, for example a first variant (not shown) replaces the central spring 14 with a flexure (flat elastic element) following the contour of the actuator body 11.

Another similar variant is shown in FIGS. 3A and 3B, showing respectively a schematic view from above and a schematic perspective view of a bistable SMA inertial actuator 30, in which it is the actuator body 31 itself rather than a flexure that by virtue of its resistance to deformation, i.e. diameter enlargement, will provide the elastic biasing/locking force for the inertial mass 33. Moreover this solution does not require a hinge located in the lower part of body 31 (i.e. element 15 in FIGS. 1 and 2) but just hinges 36, 36' for the movement of the inertial element 33 through arms 37, 37' of equal length.

This variant also includes three shape memory alloy wires 32, 32', 32" connected in parallel.

The embodiments above show that there are many variants and possible elements combinations encompassed by the inventive concept of present invention. For example another immediate variant will use SMA wires in series, i.e. in FIGS. 1-2 two SMA wires could be connected between hinge 15 and points 111, 111' respectively, or multiple wires may be used in a given pattern embedded in a suitable holding element, such as a cloth, for example as described in the Japanese patent application 2003278051.

Furthermore, preferably, the path connecting the hinges 16, 16'; 36, 36' along the two arms 17, 17'; 37, 37' and through the inertial element 13; 33 is between 1.1 and 3 times the length of a straight line connecting said hinges.

As already mentioned, an actuator made according to the present invention is capable to prevent an unintentional actuation linked to external factors such as the environment temperature variation. This aspect is of paramount importance in a wide range of applications where the accidental actuation is not only detrimental for the device operation but may even pose safety problems, airbags being among the applications where this problem needs to be properly dealt with.

In this regards, FIG. 4 shows the pressurizing portion 40 for an airbag incorporating a bistable shape memory alloy inertial actuator 10 according to the embodiment shown in FIGS. 1-2. Such an actuator 10 is mounted in a frame 41 having a channel 42 putting in communication the airbag to be inflated (not shown) with a sealed and pressurized gas bottle 43 provided with a breakable seal 44. The bistable shape memory alloy inertial actuator 10 is interposed between a loaded spring 45 and a punch 46, such that the loaded spring 45 is released and acts on punch 46 to break seal 44 upon (fast) actuation of the shape memory alloy wire 12. As already mentioned, this application greatly benefits from the use of a bistable shape memory alloy inertial actuator according to the present invention as it prevents unwanted actuation.

The use of a bistable shape memory alloy inertial actuator 10 according to the present invention in a different type of device is shown in FIG. 5. In this case a damper 50 has a stationary frame 51, with a stationary end 52 and a movable end 53 mounted on a shaft 54 sliding within frame 51 through a suitable aperture. The friction, and therefore the damping behavior encountered by the sliding shaft 54 in its vertical movement/oscillation is regulated by the bistable shape memory alloy inertial actuator 10 that in one of the two stable positions applies a higher compression on the movable shaft, increasing the frictional force applied and therefore increasing its stiffness.

FIGS. 6 and 7 show a flow diverting valve 600 that has an inlet 601 and two outlets 602 and 602' selectively put in communication with inlet 601 by a bistable SMA inertial actuator 60, that comprises a SMA wire 62 operatively connected to an inertial mass 63 acting as shutter alternately for each of the two outlets. A first arm 66 links the inertial mass 63 to a pivot 65, sliding in the actuator body 61 and around which the SMA wire 62 is wound, and a second arm 67 links the inertial mass 63 to a fixed pivot 68, said arms 66, 67 being attached to the inertial mass 63 via a pivoting joining element 69. The second arm 67 is also provided with a slot 67a in which element 69 can slide, in order to allow the rotation of arm 67 around the fixed pivot 68, and the elastic locking force is provided by a biasing spring 64 acting on the sliding pivot 65 in the direction opposing the action of the SMA wire 62. Upon fast actuation of the SMA wire 62, the inertial mass 63 slides vertically thus opening one of the outlets 602 and 602', while acting as a shutter for the other outlet. This is another application greatly benefitting from the possibility of a fast actuation to trigger the inertial mass movement, as the actuation becomes independent from the temperature of the regulated flow.

The same principle detailed in FIGS. 6 and 7 for fluidic communication in a valve can be applied also in other fields, for example in electronic circuits for low voltage/high voltage switch, or in mechanical locks for allowing physical access to the key lock aperture for key insertion, thus adding an additional security level.

Another application where the bistable actuator of present invention is advantageously applied is in smart locks such as padlocks. A SMA inertial bistable padlock is a device capable to overcome the limits of a standard SMA padlock by exploiting the advantages of the fast actuation to move one or more bistable mechanisms to lock/unlock the steel shackle of the padlock.

In fact, SMA inertial mechanisms are not affected by the thermal self-actuation because the heating rate, provided by a flame or another external heating source directly in contact with the case of the padlock, is not fast enough to switch the state of the bistable mechanism. Moreover, in order to avoid possible openings due to mechanical impacts it is possible to duplicate or triplicate the mechanism in the different working directions (e.g. x, y or z) and/or the direction of application (north-south, south-north). Since a SMA inertial padlock is electrically actuated, the electrical input could be controlled directly, e.g. fingerprints, face recognition, a key, or indirectly, e.g. Wi-Fi, Bluetooth, RFID, GSM.

An example of use of a bistable SMA actuator according to the first embodiment in a padlock is shown in the perspective views of FIGS. 7 and 8. Padlock 700 comprises a solid body 701 retaining a sliding shackle 702, and a bistable inertial SMA actuator 10 comprising a locking pin 10' that engages a shackle recess 702', as shown in FIG. 7, while FIG. 8 shows the bistable inertial SMA actuator 10 in its second stable position with the locking pin 10' disengaged from recess 702' such that shackle 702 is free to slide out from the padlock body 701.

The padlock 700 of FIGS. 8 and 9 has the sliding shackle 702 that can be fully taken out from the padlock body 701, but an immediate variant (not shown) envisions a sliding shackle with legs of different length, so that a partial sliding of the shackle frees the shorter leg allowing the opening of the padlock while at the same time retaining the shackle by means of a suitable stopper on the longer leg.

It is to be underlined that a person skilled in the art knows how to achieve quick actuation of shape memory alloy wires, see for example the paper "The Mechanical Response of Shape Memory Alloys Under a Rapid Heating Pulse" by Vollach et al published in 2010 on Experimental Mechanics, or the paper "High-speed and high-efficiency shape memory alloy actuation" by Motzki et al. published in 2018 on Smart Materials and Structures.

With actuation time it is intended the time required to bring the shape memory alloy wire to a temperature where it is in its austenite phase, the so called Af temperature. In order to achieve such effect, some electronics circuitry may be associated with the SMA wire current supply such as a condenser, etc. even though in case of the narrower wires, such as wires with a diameter lower than 100 μm, even a battery can achieve such short actuation times.

The actual parameter driving and determining the actuation time is the actuation pulse duration, i.e. the amount of time in which the SMA wire is supplied with current. Such pulse duration is much shorter than the actuation time, as defined above, which is a result of the pulse duration.

In a second aspect thereof, the invention relates to a method to operate a bistable shape memory alloy inertial actuator, more specifically a method in which the actuation pulse is short, i.e. with a duration of the current applied to the shape memory alloy wire that is comprised between 0.1 ms and 50 ms, preferably between 1 ms and 25 ms.

The invention is not limited to any specific shape memory alloy material, even though preferred are Ni—Ti based alloys such as Nitinol that may exhibit alternately superelastic wire behavior or shape memory alloy behavior according to its processing. The properties of Nitinol and methods allowing to achieve them are widely known to those skilled in the art, see e.g. the article "A Study of the Properties of a High Temperature Binary Nitinol Alloy Above and Below its Martensite to Austenite Transformation Temperature" by Dennis W. Norwich presented at the SMST 2010 conference.

Nitinol may be used as such or its characteristics in terms of transition temperature may be tailored by adding elements such as Hf, Nb, Pt, Cu. The proper choice of material alloy and its characteristics are commonly known to a person skilled in the art, see for example: http://memry.com/nitinol-iq/nitinol-fundamentals/transformation-temperatures Also the shape memory alloy wires may be used "per se" or with a coating/sheath to improve their thermal management, i.e. their cooling after being actuated. The coating sheath may be uniform, such as described in the U.S. Pat. 9.068.561 that teaches how to manage residual heat by resorting to an electrically insulating coating which is a heat conductor, while U.S. Pat. 6.835.083 describes a shape memory alloy wire having an enclosing sheath capable to improve cooling after every actuation cycle. Also a coating with a suitable dispersion of phase changing materials, such as described in WO 2019/003198 in the applicant's name, may be advantageously employed.

A series of experiments were carried out on a prototype of a bistable actuator according to the present invention as shown in FIG. 1, made with a plastic body 11 having a diameter of 155.03 mm and arms 17, 17' that were 45 mm long, with a single SMA wire 12.

SMA wires of different diameters, all of the same standard Nitinol material having an As=95° C., different inertial masses and biasing springs with different elastic constants were tested, and the results are reported in the table below, using prefix S to indicate samples made according to the present invention and prefix C to indicate comparative examples outside the scope of the present invention.

| Sample ID | Wire diameter (mm) | Bias spring K (g/mm) | Inertial mass (g) | Characterizing parameter P (mm$^{-1}$) | Observed behavior |
|---|---|---|---|---|---|
| S1 | 0.125 | 3.56 | 1.02 | 23.31 | Good - Proper bistable |
| S2 | 0.125 | 3.56 | 26.126 | 595 | Good - Proper bistable |
| C1 | 0.125 | 3.56 | 36.56 | 832 | Not working* |
| C2 | 0.150 | 5.30 | 1.024 | 11 | Bounced back+ |
| S3 | 0.150 | 5.30 | 2.85 | 30 | Good - Proper bistable |
| S4 | 0.150 | 5.30 | 6.31 | 67 | Good - Proper bistable |
| S5 | 0.150 | 5.30 | 21.63 | 230 | Good - Proper bistable |
| C3 | 0.150 | 5.30 | 136 | 1447 | Not working* |
| C4 | 0.180 | 8.16 | 2.85 | 13 | Bounced back+ |
| S6 | 0.180 | 8.16 | 21.63 | 104 | Good - Proper bistable |
| S7 | 0.180 | 8.16 | 30.8 | 147 | Good - Proper bistable |
| S8 | 0.180 | 8.16 | 42.46 | 203 | Good - Proper bistable |
| S9 | 0.180 | 8.16 | 136 | 653 | Good - Proper bistable |
| C5 | 0.180 | 8.16 | 167.9 | 806.7 | Not working* |
| C6 | 0.225 | 9.43 | 2.85 | 7.6 | Bounced back+ |
| S10 | 0.225 | 9.43 | 167.9 | 446.5 | Good - Proper bistable |
| S11 | 0.225 | 9.43 | 193.2 | 513.8 | Good - Proper bistable |
| C7 | 0.300 | 21.5 | 21.6 | 14.1 | Bounced back+ |

\* Not working: the inertial mass did not reach the second position
+ Bounced back: the inertial mass bounced back to the starting position As it is possible to observe from the various examples reported above, only the combinations with the proper value of the characterizing parameter P were capable to achieve satisfactory bistable operations, while values both above and below the specified range resulted in unsatisfactory operation.

All the results reported in the above table have been achieved with an actuation pulse duration of 13 ms.

The evaluation of the impact of the SMA wire with different actuation pulse durations has been carried out for a subset of samples according to the present invention, namely samples S1, S4, S7. More specifically, the system behavior has been evaluated in a too quick actuation (pulse duration <0.1 ms) with the inertial mass bouncing back, while with a too slow actuation (pulse duration >50 ms) the inertial mass was not able to reach the second stable position.

The invention claimed is:

1. A bistable shape memory alloy inertial actuator comprising a body connected to one or more shape memory alloy wires actuatable through a current pulse generated by an electrical circuit, said one or more shape memory alloy wires having a diameter comprised between 0.025 and 0.5 mm and being in operational contact with an inertial element movable between a first stable position and a second stable position and vice versa under the concurrent actuation of the one or more shape memory alloy wires,
   wherein said actuator is subjected to a locking force with an elastic constant K, expressed in g/mm,
   wherein the actuator has a parameter P defined as the inverse of said elastic constant multiplied by the ratio between the mass M of said inertial element, expressed in grams, and the total cross-sectional area A, expressed in mm$^2$, of the shape memory alloy wires in operational contact with the inertial element, said parameter P=(1/K)*(M/A) being comprised between 15 and 750 mm$^{-1}$, and
   wherein said electrical circuit is configured to generate a current pulse with a duration comprised between 0.1 and 50 ms.

2. The bistable shape memory alloy inertial actuator according to claim 1, wherein at least one element of the electrical circuit that generates the current pulse is mounted on the body.

3. The bistable shape memory alloy inertial actuator actuator according to claim 2, wherein said at least one element of the electrical circuit is a capacitor.

4. The bistable shape memory alloy inertial actuator according to claim 1, wherein it includes multiple shape memory alloy wires that are connected in parallel or in series.

5. The bistable shape memory alloy inertial actuator according to claim 1, wherein said locking force with elastic constant K is provided by an elastic element connected to the actuator body or by the actuator body itself.

6. The bistable shape memory alloy inertial actuator according to claim 1, wherein the actuator body has a main portion with a circular segment geometry.

7. The bistable shape memory alloy inertial actuator according to claim 6, wherein said circular segment has a diameter comprised between 1 mm and 20 cm.

8. The bistable shape memory alloy inertial actuator according to claim 6, wherein a plurality of hinges are present on the main portion of the actuator body with a circular segment geometry.

9. The bistable shape memory alloy inertial actuator according to claim 8, wherein two hinges are in correspondence of terminal parts of the main portion of the actuator body with a circular segment geometry.

10. The bistable shape memory alloy inertial actuator according to claim 9, wherein the inertial element is connected to the actuator body through the hinges in correspondence of the terminal parts of the main portion thereof via two arms of equal length.

11. The A bistable shape memory alloy inertial actuator according to claim 10, wherein the length of the path connecting the hinges along the two arms and through the inertial element is between 1.1 and 3 times the length of a straight line connecting said hinges.

12. A method, comprising:
operating the bistable shape memory alloy inertial actuator according to claim 1, wherein the duration of the current pulse for the actuation of the one or more shape memory alloy wires is comprised between 0-1 ms and 50 ms.

13. The bistable shape memory alloy inertial actuator according to claim 1, wherein said parameter $P=(1/K)*(M/A)$ is comprised 25 and 500 mm$^{-1}$.

14. The bistable shape memory alloy inertial actuator according to claim 6, wherein the circular segment is between ⅔ and ⅚ of a full circle.

15. The method according to claim 13, wherein the duration of the current pulse is comprised between 1 ms and 25 ms.

* * * * *